** 3,402,601
TENSION MEASURING DEVICE
Kurt W. Heineman, Houston, Tex., assignor to Schlumberger Technology Corporation, Houston, Tex., a corporation of Texas
Filed Oct. 28, 1965, Ser. No. 505,550
3 Claims. (Cl. 73—143)

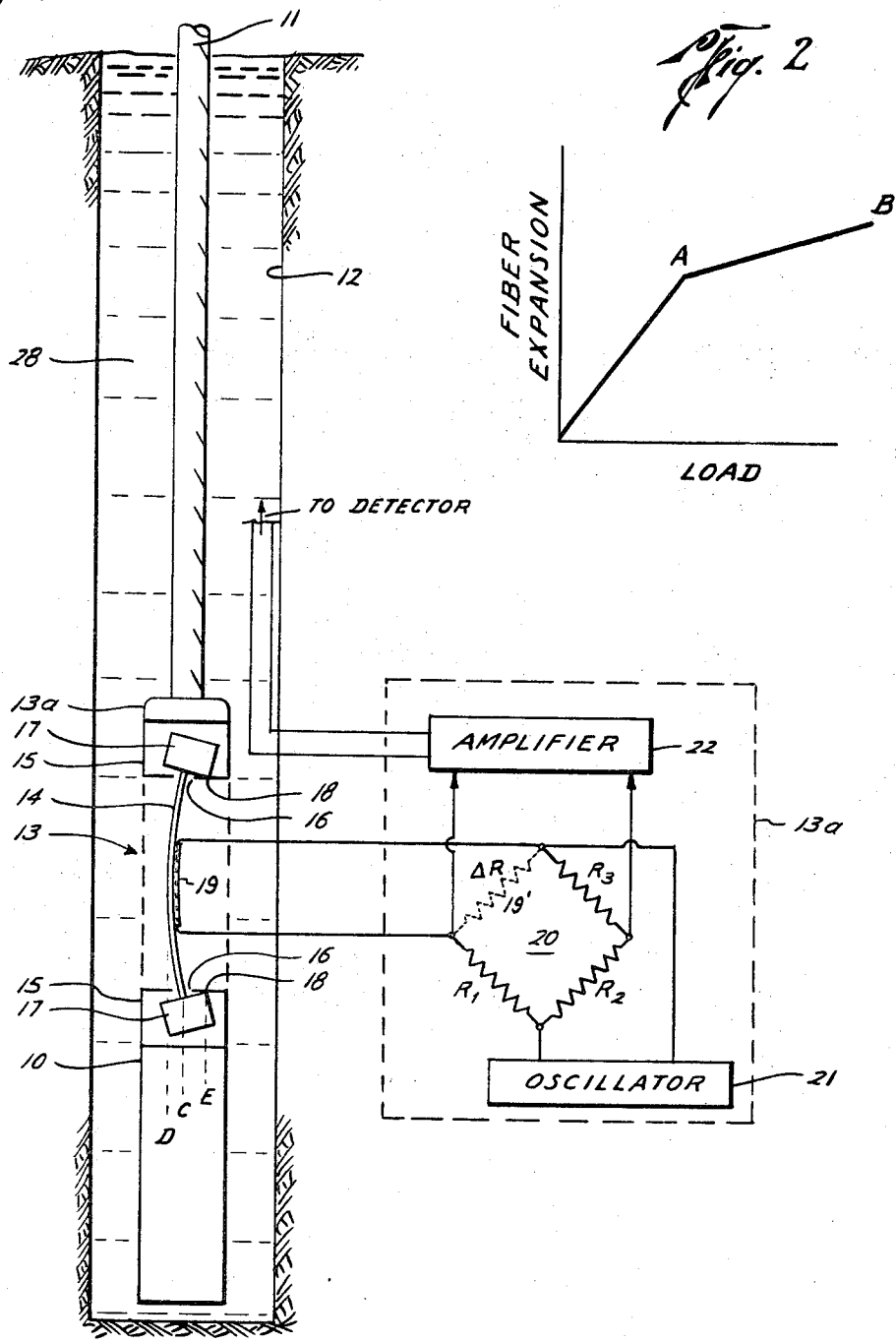

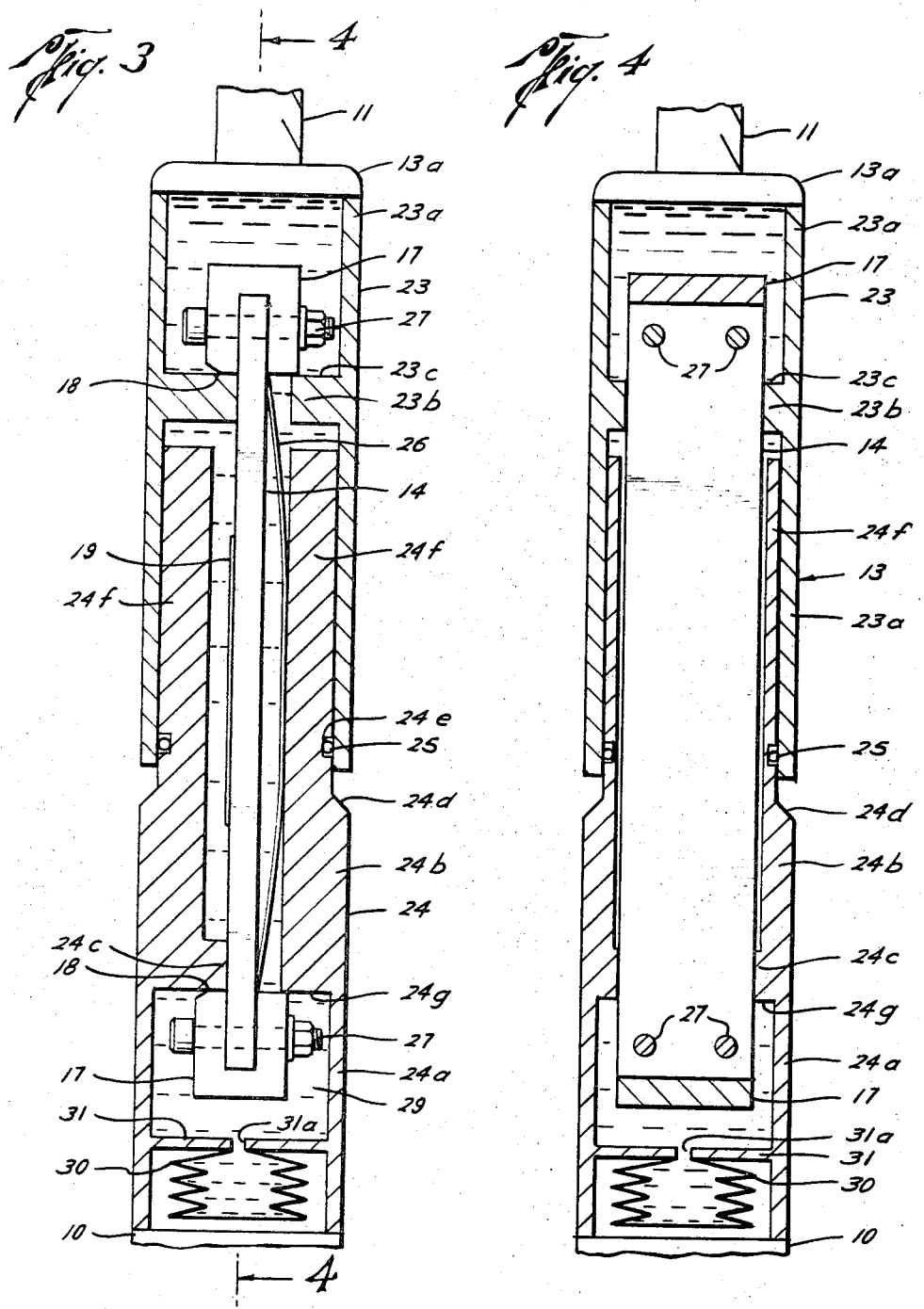

ABSTRACT OF THE DISCLOSURE

In accordance with an illustrative embodiment of the invention, tension measuring apparatus is shown which provides two separate degrees of resolution for measured loads. This is especially desirable for measuring the tension between a cable and a tool supported on the end of the cable. To accomplish this, a curved load bar having a fiber expansion element attached thereto is held at both ends thereof by a pair of load transmitting means which are pivoted on a pair of rigid members attached to the cable and tool. By so doing, a combination of tensile and bending stresses act on the curved load bar until it straightens out, at which time the bending stress becomes non-existent leaving only the tensile stress.

---

This invention relates to devices for measuring tension and more particularly to devices for measuring the tension between the end of a cable and a load on the end of that cable.

This invention is particularly adapted for use in the logging of earth boreholes wherein an exploratory tool having a given weight is lowered into the borehole on the end of a cable having elastic properties. When investigating the subsurface earth formations surrounding a borehole, there are various forces which act on the tool and cable causing the cable to stretch. These forces may include, for example, the cable and tool dragging against the side of the borehole. This cable stretch can become extreme when the cable or tool becomes momentarily stuck against the side of the borehole, thus causing an instantaneous stretch of the cable. It is desirable to know the amount of this cable stretch for purposes of accurately determining the exact location of the tool within the borehole. This is necessary so that the exact location of oil bearing strata can be determined.

One method of determining this cable stretch is to utilize a tension measuring device at the surface of the earth, as shown in U.S. Patent No. 3,027,649, granted to Raymond W. Sloan on Apr. 3, 1962. However, a surface tension device can only provide an average measure of the tension encountered by the cable in the borehole because of the thousands of feet of cable between the tool and the surface of the earth. A dynamic force applied at the tool in the borehole would not appear immediately at the surface of the earth in the form of a corresponding change in tension because of the great length of cable. The measured tension, appearing at the surface of the earth, will be vastly distorted because of dampening by the cable. The tension variations occurring at the logging device may be delayed by as much as several seconds from reaching the surface of the earth due to the elasticity of the cable.

Thus, it would be desirable to provide a downhole tension device at the tool to provide instantaneous indications of tension at the tool, which tension indications are transmitted to the surface of the earth electrically, thus eliminating the problems caused by the long length of cable. A system of this type is shown in copending application Ser. No. 518,370, filed on Jan. 3, 1966 by William E. Bowers and William A. Whitfill.

There is a maximum value of tension on the cable at which the cable will break, thus causing loss of the tool. It is desirable for the operator who is lowering the cable into the borehole to have a continuous indication of the tension on the cable so that if this tension should increase to a point where the cable is in danger of breaking, the operator may stop the cable reeling device at the surface of the earth. However, the tension at which the cable will break is far greater than the tension encountered under normal operating conditions throughout the borehole.

Thus, if the cable tension measuring device has a linear range from zero to the maximum tension at which the cable will break, as in prior art tension measuring devices, the accurateness of the range encountered during normal operating conditions will not be sufficient. Since the tension encountered under normal operating conditions is the tension that must be accurately determined for depth correction operations, a tension measuring device which has a linear range from zero to the maximum tension at which the cable will break, will not provide tension indications sufficient for accurate depth corrections.

Thus, it is desirable to provide a tension measuring device which will give good resolution throughout the range of tension encountered during normal operating conditions, but which will still indicate the maximum tension at which the cable will break.

It is an object of the invention therefore to provide new and improved apparatus for providing accurate indications of tension on a cable at relative low values of tension and also providing tension indications at very large values of tension.

It is another object of the invention to provide new and improved apparatus for measuring the tension in a cable wherein a large resolution of tension measurements are obtained at relatively low values of tension and yet very large values of tension can also be measured.

In accordance with the invention, a device for measuring tension comprising force receiving members adapted to have forces applied thereto and a curved load bar disposed between the force receiving members and pivotally coupled thereon so that forces applied to the force receiving members will be transferred to the curved load bar to produce bending and tensile stresses therein. The invention further comprises sensing means integral with the curved load bar and responsive to said stresses whereby an indication of the applied load may be obtained.

For a better understanding of the present invention, together with other and further objects thereof, reference is had to the following description taken in connection with the accompanying drawings, the scope of the invention being pointed out in the appended claims.

Referring to the drawings:

FIG. 1 illustrates the tension measuring device of the present invention located between a tool and the end of a cable within a borehole, and a schematic representation of the electrical circuitry associated therewith;

FIG. 2 shows a plot of fiber expansion versus load for the tension measuring device of the present invention;

FIG. 3 shows in greater detail the tension measuring device of the present invention; and FIG. 4 shows a cross-section of the apparatus of FIG. 3 taken along the section line 4—4 of FIG. 3.

Referring now to FIG. 1, there is shown an exploratory tool 10 supported by an armored multi-conductor cable 11 within a borehole 12. A drilling mud 28 is located within the borehole 11. The cable 11 is reeled in and out of the borehole by a suitable cable reeling device (not shown) located at the surface of the earth. The tool 10 can include in any type of investigating apparatus, the particular type not being important to the present invention.

Located between the tool 10 and cable 11 is the tension measuring device 13 of the present invention. Located within the tension measuring device 13 is a curved load bar 14. The tension measuring device also includes two rigid members 15 at either end of the curved load bar, one of the rigid members 15 rigidly connected to the cable 11 and the other rigid member 15 rigidly connected to the tool 10. The dotted lines between the rigid members 15 represent the portion of tension measuring device 13 which surrounds curved load bar 14, which will be explained in greater detail in connection with FIGS. 3 and 4. The curved load bar 14 passes through openings 16 in rigid members 15 which face each other within the tension measuring device 13. Both ends of the curved load bar 14 are rigidly connected to a pair of clevises 17. The clevises 17 are pivoted on a knife edge thereof at a pivot point 18 on the sides of rigid members 15 which are facing one another. A strain gauge element 19 whose electrical characteristics vary with fiber expansion of the load bar 14 is attached to the surface of curved load bar 14 on the inner concave surface thereof. The strain gauge element 19 is solidly attached, as by gluing, to the curved load bar 14 such that the fiber expansion of the strain gauge element 19 will vary in direct proportion to the fiber expansion of the clurved load bar 14. The change in resistance $\Delta R$ of strain gauge element 19 is proportional to the fiber expansion thereof.

The resistance of strain gauge element 19 makes up one arm of a bridge circuit 20 which comprises the resistance due to strain gauge element 19, designated 19', and fixed resistors $R_1$, $R_2$, and $R_3$. An oscillator 21 is connected to the junction between resistors $R_1$ and $R_2$ and to the junction between strain gauge element 19 and resistor $R_3$. The input of an amplifier 22 is connected to the junction between resistors $R_2$ and $R_3$ and to the junction between resistor $R_1$ and strain gauge element 19. The output from amplifier 22 is supplied to the detecting circuitry (not shown) at the surface of the earth through conductors of the cable 11.

As stated above, it would be desirable to have a tension measuring device which has a large resolution at low values of tension or load and yet provides indication of tension at very large values of tension. To accomplish this, a tension measuring device having fiber expansion versus load characteristics as shown in FIG. 2 is utilized. From FIG. 2, it can be seen that the fiber expansion increases at a great rate at low values of load between O and A. From points A to B on the curve of FIG. 2, the fiber expansion changes only slightly with changes in load.

Thus, by utilizing a tension measuring device with the fiber expansion versus load chacteristics shown in FIG. 2, a large resolution is obtained during the interval O to A, which is the interval encountered under normal borehole operating conditions, which must be accurate for depth corrections, and a very small resolution is obtained during the interval A to B thus allowing the maximum tension at which the cable will break to also be measured. If the load bar 14 of FIG. 1, instead of being in a curved configuration, were straight in the same manner as the prior art load bars, the change in resistance $\Delta R$ would be directly proportional to the measured tension throughout the range O to B in FIG. 2 without any change in resolution.

Now concerning how the apparatus of FIG. 1 provides the fiber expansion versus load curve of FIG. 2, refer back to FIG. 1. Taking one end of the curved load bar 14, the point at which the curved load bar 14 is attached to the clevis 17 is designated C. The maximum displacement of the curved load bar 14 from the point C is designated D. The point on rigid member 15 at which the knife edge of the clevis 17 contacts is designated E. When there is a force existing between the rigid members 15 at each end of the curved load bar 14, the fiber expansion of the curved load bar 14, and thus the strain gauge element 19, will be proportional to the sum of the tension force plus the bending moment on the curved load bar 14. The bending moment on the curved load bar 14 will be equal to the product of the force F between the rigid members 15 and the distance C to D+C to E. Thus the bending moment on the curved load bar 14 can be written as $F(C-D+C-E)$. Thus the fiber expansion or change in resistance $\Delta R$ can be written as $$F+F(C-D+C-E)$$

This value of $\Delta R$ represents the O to A portion of the curve of FIG. 2.

Now, when the clevises 17 on both ends of curved load bar 14 have been pulled down by the force F to the point at which the portions of clevises 17 which face one another contact the face of the rigid members 15, there is no longer a pivot point 18 and thus the bending moment is reduced to zero. The forces applied after this occurrence provide tensil stresses only in curved load bar 14. Thus, the change in resistance $\Delta R$ of strain gauge element 19 at this time is proportional to the force F only, since the bending moment has been reduced to zero. The point at which the bending moment is reduced to zero is designated as the point A in the curve of FIG. 2. Thus, the portion of the curve of FIG. 2 between A and B has a much smaller resolution than that portion of the curve between zero and A, due to the fact that the fiber expansion of curved load bar 14 due to the bending moment has been removed.

It must be pointed out that the radius of curvature of the curved load bar 14 in FIG. 1 has been exaggerated in order to show more clearly the principle of operation of the tension measuring device of the present invention. The actual radius of curvature of the curved load bar 14 is 93.5 inches. Thus, the distance C to E is much greater than the distance C to D in FIG. 1. Therefore, even though the distance C to D is decreasing as the curved load bar 14 straightens out, it has negligible affect on the total distance C to E plus C to D.

A curved load bar such as shown in FIG. 1 could be utilized without the clevises 17, thus providing a moment arm equal to the distance C to D alone. This would provide a greater resolution at low values of load than at higher values of load, although the difference in resolution would be much less than with the clevises 17. However, since the distance C to D would be continually decreasing as the curved load bar 14 is straightening out, a curve as shown in FIG. 2 could not be obtained. However, by utilizing the curved load bar 14 in combination with the clevises 17, a bending moment is obtained which is so large that the decrease of the distance C to D due to the curved load bar 14 straightening out, is negligible and the difference in resolution between the O-A and A-B portion of the FIG. 2 curve are much greater. Additionally, a sharp change in the fiber expansion versus load characteristics are obtained at the point A on the fiber expansion versus load curve of FIG. 2 since all of the bending moment arm (C-D and C-E) is removed at one time.

The electrical circuitry for converting the change in resistance $\Delta R$ of strain gauge element 19 to an electrical signal to be transmitted to the surface of the earth is shown within the dotted box 13a, which corresponds to the portion 13a of the tension measuring device 13. This electrical circuitry could be contained anywhere within the downhole apparatus, as for example, within the tool 10. The oscillator 21 provides a signal to the bridge circuit 20, which supplies a signal to amplifier 22 proportional to the change in resistance $\Delta R$ of strain gauge element 19. After amplification by amplifier 22, this signal is sent to a detecting circuitry at the surface of the earth by conductors running through armored multi-conductor cable 11.

Looking now at FIG. 3, there is shown a more detailed representation of a typical construction of the tension measuring device of FIG. 1. This FIG. 3 embodiment is only an example of typical apparatus for enclosing the curved load bar 14 and clevises 17 of the present invention. The tension measuring device 13 has two rigid members, one at each end thereof. The rigid member 23 is shown connected to the cable 11 and the rigid member 24 is shown connected to the tool 10. The rigid member 23 comprises a cylindrical portion 23a, the top of which is attached to the housing 13a and the bottom of which is open. The interior of the cylindrical portion 23a of the rigid member 23 is hollow. A supporting member 23b juts into the hollow inner portion enclosed by rigid member 23.

The rigid member 24, which is connected to the tool 10, is cylindrical in shape also. A portion 24a of rigid member 24, which is attached to the tool 10 has a thickness such that the hollow portion enclosed by the portion 24a is relatively large in diameter. Just above the portion 24a, the rigid member 24 increases in thickness, shown as portion 24b thereof, thus decreasing the hollow interior portion thereof. A portion 24c of rigid member 24 juts further into the hollow interior portion enclosed by rigid member 24 on one side only of the rigid member 24. Above the portion 24b, the exterior diameter of rigid member 24 gradually decreases at the point designated 24d so that the outer surface of rigid member 24 which is adjacent to rigid member 23 is slightly less in diameter than the inner surface of the portion 23a of rigid member 23. This portion of rigid member 24 which is adjacent to portion 23a of rigid member 23, is designated 24f. A cavity 24e is formed within the rigid member 24 on the outer face thereof which is adjacent to the portion 23a of rigid member 23. This cavity extends completely around the circumference of the outer surface of rigid member 24. Located within the cavity 24e is a rubber O-ring 25.

Extending through the hollow interior of support members 23 and 24 is the curved load bar 14, to which is attached the strain gauge element 19. Attached to the curved load bar 14 within the hollow portion enclosed by rigid members 23 and 24 is a leaf spring 26. The leaf spring 26 contacts the portion 24b of rigid member 24. The convex side of the curved load bar 14 is in the direction of the leaf spring 26. The ends of the curved load bar 14 are located in a cavity within the clevises 17. There are two bolt and nut pairs 27 at each end of the curved load bar 14 which secure the clevises 17 to each end of the curved load bar 14. The clevises 17 are held in a relative position to the rigid members 23 and 24 by portion 23c and 24g of support members 23 and 24 respectively, which keep the clevises 17 from moving towards one another when force is applied between the rigid members 23 and 24. The clevises 17 pivot at the points 18 on the faces 23c and 24g of rigid members 23 and 24 respectively. The edges of clevises 17 on the sides thereof which pivot at points 18 are cut off to reduce the wear on the pivot edges of clevises 17. The concave side of curved load bar 14 is shown resting against one side of the portion 23b of rigid member 23 and the portion 24c of rigid member 24. This is to maintain the curved load bar 14 in a straight position when the force F between the tool 10 and the cable 11 straightens curved load bar 14 out. The convex side of curved load bar 14 is free to bend toward leaf spring 26 without interference.

Located within the hollow portion surrounded by fixed members 23 and 24 is an oil substance 29. This oil 29 flows freely throughout the hollow portion of the tension measuring device 13. Located near the bottom of tension measuring device 13 is a metal plate 31 with an opening 31a located in the center thereof. A bellows 30, made of suitable elastic material, is located on the opposite side of metal plate 31 from the curved load bar 14. Bellows 30 is connected to the opening 31a such that the oil 29 can flow freely between bellows 30 and the hollow interior portion of tension measuring device 13.

Looking now at FIG. 4, there is shown the cross-section view of FIG. 3 taken along the section lines 4—4 thereof. From FIG. 4, it can be seen that the curved load bar 14 is much greater in width than depth. Thus, the rigid members 23 and 24 must have different dimensions at different circumferential points to conform to the dimensions of curved load bar 14. Thus, section 23b of rigid member 23 will have less thickness in the FIG. 4 view than in the FIG. 3 view due to the greater width of curved load bar 14. The same thing applies to sections 24b, 24c, and 24f. In the FIG. 4 view, section 23b of rigid member 23 and section 24c of rigid member 24 have both sides thereof in contact with the curved load bar 14 to hold it in place since curved load bar 14 bends in a direction perpendicular to the page in FIG. 4.

Looking now at FIGS. 3 and 4 in conjunction, the curved load bar 14 will bear the full force applied between the tool 10 and cable 11. The rigid members 23 and 24, which are rigidly attached to cable 11 and tool 10 respectively, provide supports for clevises 17 and also act to keep the drilling mud 28 out of the interior of the tension measuring device 13. The portion 24f of rigid member 24 and portion 23a of rigid member 23 are in slidable contact with one another in such a manner as to substantially keep the drilling mud 28 out of the interior of the tension measuring device 13, and yet loose enough to provide negligible friction therebetween. The rubber O-ring 25 insures that the interior of tension measuring device 13 will remain free of drilling mud 28.

The oil 29 and bellows 30 are included in the tension measuring device 13 to insure that the pressure within the interior of tension measuring device 13 is equal to the pressure exerted by drilling mud 28 outside and to lubricate the sliding parts of rigid members 23 and 24. As the pressure increases or decreases, the bellows 30 will expand or contact accordingly.

Under initial no-load conditions, curved load bar 14 is bent outward toward the leaf spring 26 and the clevises 17 are pivoted at the point 18 thus providing the moment arm (C–D+C–E) of FIG. 1. As the force applied between tool 10 and cable 11 increases, the curved load bar 14 straightens out causing the clevises 17 to rest against the face 23c of rigid member 23 and the face 24g of rigid member 24 thus removing the moment arm. As the curved load bar 14 is straightening out the portion 23b of rigid member 23 and 24c of rigid member 24, and the leaf spring 26, insure that the curved load bar 14 and clevises 17 will remain in the positions shown in FIG. 3, thus avoiding sliding. As the force between tool 10 and cable 11 increases, the portions 23a and 24f of rigid members 23 and 24 will begin sliding with respect to one another, thus causing substantially all of the applied force to be applied to curved load bar 14.

It can now be seen that the apparatus of the present invention will provide a fiber expansion versus load curve as shown in FIG. 2. This is accomplished by using the curved load bar 14 having the strain gauge element 19 attached thereto, and rigid members 23 and 24 at each end of the curved load bar 14 with clevises 17 attached to the ends of the curved load bar 14 for holding the ends of the curved load bar 14 in a relative position to the rigid members 23 and 24 at each end of the curved load bar 14, so that substantially all of the force applied between the rigid members 23 and 24 will be applied to the curved load bar 14. Additionally, it can be seen that the rigid members 23 and 24 at each end of the curved load bar 14 have portions thereof which extend along the length of the curved load bar 14 to keep the drilling mud 28 out of the interior portion of the tension measuring device 13.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A device for measuring tension in a cable comprising:
   (a) a curved load bar with at least one element whose electrical characteristics vary with fiber expansion, attached to the curved load bar;
   (b) a rigid member at each end of the curved load bar and adapted to have forces applied thereto; and
   (c) load transmitting means attached to each end of the curved load bar and pivotally contacting the rigid member at each end of the curved load bar for holding the ends of the curved load bar in a relative position to the rigid members at each end of the curved load bar so that substantially all of the force applied between the rigid members will be applied to the curved load bar causing tensile and bending stresses in the curved load bar to vary the fiber expansion of said at least one element.

2. A device for measuring tension in a cable comprising:
   (a) a curved load bar with at least one element whose electrical characteristics vary with fiber expansion, attached to the curved load bar;
   (b) a rigid member at each end of the curved load bar and adapted to have forces applied thereto; and
   (c) load transmitting means rigidly attached to each end of the curved load bar and pivotally contacting the rigid member at each end of the curved load bar for exerting bending stresses in addition to tensile stresses on the curved load bar when a load is applied between said rigid members, the means adapted to be pulled into a non-pivoted position upon the load attaining a given level, so that the bending stresses become non-existent upon the load pulling the means into the non-pivoted position.

3. A device for measuring tension, comprising:
   (a) force receiving members adapted to have forces applied thereto;
   (b) a curved load bar disposed between the force receiving members and pivotally coupled thereon, so that forces applied to the force receiving members will be transferred to the curved load bar to produce bending and tensile stresses therein; and
   (c) sensing means integral with the curved load bar and responsive to said stresses whereby an indication of the applied load may be obtained.

References Cited

UNITED STATES PATENTS 3,240,057    3/1966    Ormond _____ 73—141

FOREIGN PATENTS 887,695    11/1943    France.
139,131    5/1960    Russia.

RICHARD C. QUEISSER, *Primary Examiner.*

JAMES H. WILLIAMSON, *Assistant Examiner.*